United States Patent
Barkay et al.

(10) Patent No.: US 9,521,108 B2
(45) Date of Patent: Dec. 13, 2016

(54) TECHNIQUES ENABLING EFFICIENT SYNCHRONIZED AUTHENTICATED NETWORK ACCESS

(75) Inventors: Omri Barkay, Kibutz Sarid (IL); Shachaf Levi, Zichron Yakovi (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/074,166

(22) Filed: Mar. 29, 2011

(65) Prior Publication Data

US 2012/0254379 A1    Oct. 4, 2012

(51) Int. Cl.
| | | |
|---|---|---|
| *G06F 15/177* | (2006.01) | |
| *G06F 15/16* | (2006.01) | |
| *H04L 29/12* | (2006.01) | |
| *H04L 29/06* | (2006.01) | |
| *H04W 12/06* | (2009.01) | |
| *H04W 84/12* | (2009.01) | |

(52) U.S. Cl.
CPC ........... *H04L 61/2015* (2013.01); *H04L 63/08* (2013.01); *H04W 12/06* (2013.01); *H04W 84/12* (2013.01)

(58) Field of Classification Search
CPC ..... H04L 61/2015; H04L 63/08; H04W 12/06; H04W 84/12
USPC ........................................ 709/221, 227, 222
See application file for complete search history.

(56) References Cited

U.S. PATENT DOCUMENTS

| | | | |
|---|---|---|---|
| 7,035,917 B2 * | 4/2006 | Yamasita ...................... | 709/220 |
| 7,143,435 B1 | 11/2006 | Droms et al. | |
| 7,983,418 B2 * | 7/2011 | Oyama et al. ................ | 380/248 |
| 2006/0036733 A1 * | 2/2006 | Fujimoto et al. ............. | 709/225 |
| 2007/0127506 A1 | 6/2007 | Absillis | |
| 2007/0214270 A1 * | 9/2007 | Absillis ......................... | 709/227 |
| 2007/0230423 A1 * | 10/2007 | Yoshida et al. ............... | 370/338 |
| 2008/0127323 A1 * | 5/2008 | Soin et al. ...................... | 726/12 |
| 2010/0241861 A1 * | 9/2010 | Yoshimoto et al. .......... | 713/170 |
| 2012/0102146 A1 * | 4/2012 | Wu et al. ...................... | 709/217 |

(Continued)

FOREIGN PATENT DOCUMENTS

| | | |
|---|---|---|
| CN | 101174952 A | 5/2008 |
| CN | 101416176 A | 4/2009 |

(Continued)

OTHER PUBLICATIONS

Office Action received for Japanese Patent Application No. 2012073121, mailed on Jul. 30, 2013, 4 pages of Office Action Including 2 pages of English Translation.

(Continued)

*Primary Examiner* — Tonia L Dollinger
*Assistant Examiner* — Adam Cooney
(74) *Attorney, Agent, or Firm* — Ellis B Ramirez; PRASS LLP

(57) ABSTRACT

An embodiment of the present invention provides a method of accelerating a network connection to a wireless network and avoiding unnecessary wait intervals, comprising synchronizing DHCP discover or request packets with an authentication mechanism utilized by the wireless network. In an embodiment of the present invention the wireless network may conform to Institute for Electrical and Engineers (IEEE) 802.1x standards and specific 802.1x states may trigger a DHCP request to ensure a DHCP process will start in a synchronized way, on-time when needed and capable to provide network access.

15 Claims, 3 Drawing Sheets

(56) References Cited

U.S. PATENT DOCUMENTS

2013/0170471 A1* 7/2013 Nix .............................. 370/331

FOREIGN PATENT DOCUMENTS

| | | |
|---|---|---|
| CN | 101971567 A | 2/2011 |
| CN | 101977383 A | 2/2011 |
| JP | 2007-180998 A | 7/2007 |
| WO | 2006/098279 A1 | 9/2006 |
| WO | 2012/135090 A2 | 10/2012 |
| WO | 2012/135090 A3 | 12/2012 |

OTHER PUBLICATIONS

International Preliminary Report on Patentability with Written Opinion received for PCT Patent Application No. PCT/US2012/030515 mailed on Oct. 10, 2013, 7 pages.
International Search Report and Written Opinion Received for PCT Patent Application No. PCT/US2012/030515, mailed on Oct. 19, 2012, 10 pages.
Office Action received for Japanese Patent Application No. 2012-073121, mailed on Apr. 9, 2013, 4 pages of Office Action including 2 pages of English translation.
Office Action received for Chinese Patent Application No. 201210234640.X, mailed on Jun. 26, 2014, 31 pages of English Translation and 23 pages of Chinese Office Action.

* cited by examiner

TECHNIQUES ENABLING EFFICIENT SYNCHRONIZED AUTHENTICATED NETWORK ACCESS

BACKGROUND

Wireless networks have grown increasingly in importance and have varying uses; as have mobile devices, personal computers and many other devices that utilize these networks. The increasing popularity in the use of wireless LAN, providing both enterprise and consumer comparable wired LAN connectivity, requires additional security due to radio frequency medium shared characteristics.

Radio frequency signals tend to spread beyond the covered facility premises, and fence based physical security is no longer adequate. Popular mechanism for providing secure access to the network has been the 802.1x framework. The 802.1x framework provides a suite of allowing only authenticated access to the network.

Until the client passes the authentication process, it is denied from sending all traffic, but the traffic necessary to complete the authentication process to the network. In recent years we are seeing significant growth in the demand for mobility, with substantial increase in the use of portable devices such as laptops, netbooks, smart-phones and ultra mobile devices. Customers have grown used to expect the same level of service while being mobile and stationary, and look for a snappy connection initially and during inter network roams.

Thus, a strong need exists for techniques enabling rapid and efficient network access.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
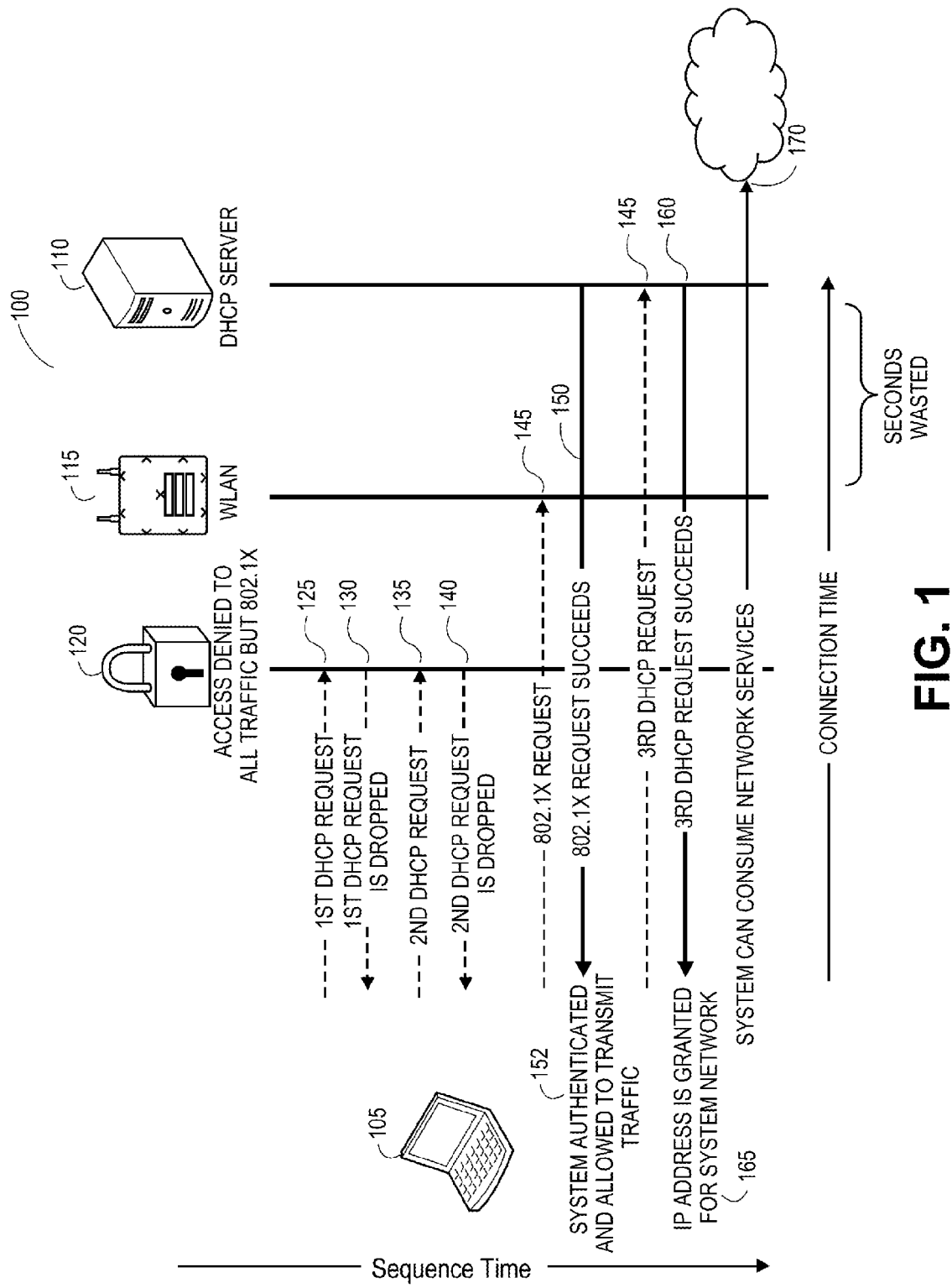
FIG. 1 illustrates existing flows for authenticated network access and time wasted in this approach.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

An algorithm, technique or process is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a non-volatile storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below.

In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like), wireless wide are networks (WWAN), wireless metropolitan area networks (WMAN) and Mesh networks.

Embodiments of the present invention may refer to mobile devices. A mobile device (also known as a handheld device, netbook, tablet computer, handheld computer, mobile information device, smartphone, or simply handheld) may be a pocket-sized computing device, typically having a display screen with touch input and/or a miniature keyboard. In the case of the personal digital assistant (PDA) the input and output are often combined into a touch-screen interface. PDAs are popular amongst those who require the assistance and convenience of certain aspects of a conventional computer, in environments where carrying one would not be practical. Enterprise digital assistants can further extend the available functionality for the business user by offering integrated data capture devices like barcode, RFID and smart card readers.

Although not limited in this respect, one type of such mobile device is a Smartphone. A smartphone may be defined as device that lets you make telephone calls, but also adds features that you might find on a personal digital assistant or a computer. A smartphone also offers the ability to send and receive e-mail and edit Office documents, for example. Other types of mobile devices may be mobile information devices (MIDs).

Another mobile device may be referred to as a tablet computer. A tablet computer, or simply tablet, is a complete personal mobile computer, larger than a mobile phone or personal digital assistant, integrated into a flat touch screen and primarily operated by touching the screen. It often uses an onscreen virtual keyboard or a digital pen rather than a physical keyboard.

The term may also apply to a "convertible" notebook computer whose keyboard is attached to the touchscreen by a swivel joint or slide joint so that the screen may lie with its back upon the keyboard, covering it and exposing only the screen for touch operation.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause and effect relationship).

As mentioned above, heretofore until the client passes the authentication process, it was denied from sending all traffic except the traffic necessary to complete the authentication process to the network; and customers have grown used to expect the same level of service while being mobile and stationary, and look for a snappy connection initially and during inter network roams.

Historically, the Dynamic host service protocol was introduced in the early 1990's, in order to provide an aide to the depleting address space of IPv4. Although it was designed as band-aid solution, due to its effectiveness, along with other solution e.g. NAT, it has successfully remained very popular in current infrastructure. As DHCP was designed during the 1990's, it did not take into account the future changes and evolution of the connection, and does not factor in the 802.1x authentication process. As a result, DHCP is not synchronized with 802.1x states, and may begin the process while the port is not yet authenticated, thus the DHCP discover packet will be dropped. DHCP will retry using additional DHCP discover packets, at a growing time intervals, depending on the client implementation.

Due to the fact that the DHCP process may not begin in a synchronized manner with the 802.1x EAP authentication exchange, the client may successfully pass the 802.1x authentication process, but may have to wait for the next DHCP retry instance.

Currently DHCP network addressing and 802.1x authentication execute as two separate processes, DHCP discover request messages sent before 802.1x completed successfully will be dropped. Embodiments of the present invention will save several seconds in the process of connecting to a secure network, which is crucial to a user's experience. Today's network address process is not synchronized with the network security process causing a waste of time in the overall access performance. As addressing using DHCP, which is common in all IPv4 networks today, is not synchronized with security authentication services, DHCP initial exchange may be dropped at the network access layer.

FIG. 1, shown generally as 100, illustrates current techniques and time wasted waiting for the system to be able to consume network services and depicts a system 100 utilizing such existing techniques; and may include a mobile device 105, WLAN 115 and DHCP server 110. Access being to all traffic but 802.1x is illustrated as 120. Mobile device 105 may make a first DHCP request at 125 and access is denied to all traffic but 802.1x and first DHCP request is dropped 130. A second DHCP request is sent from mobile device 105 at 135 and second DHCP request is dropped at 140 as access is denied to all but 802.1x traffic. At 145, an 802.1x request is made to WLAN 115 and at 150 802.11 request succeeds; thereby system is authenticated and allowed to transmit traffic 152. A third DHCP request is made at 155 to DHCP server 110 via WLAN 115 and succeeds at 160 so that IP address is granted for system network 165. At 170 system may consume network services. The seconds wasted in this exchange are shown at 175.

An advantage of embodiments of the present invention is in synchronizing the two services, and reducing access time connecting to the network to the bare minimum. Applying embodiments of the invention herein, the network addressing process will only begin after the host has been authenticated, and access to the network has been granted security-wise. As a result, the host will not attempt to begin an address acquirement process, until the exchange can actually be carried out.

Embodiments of the present invention provide synchronizing the DHCP discover or request packets, with the 802.1x authentication mechanism in order to accelerate the network connection process and avoid unnecessary wait intervals. By adding the ability for specific 802.1x states to trigger a DHCP request, this will ensure the DHCP process will start in a synchronized way, on-time when needed and capable to provide network access. Embodiments of the present invention may amend the behavior of a network driver allowing it to trigger a DHCP discover or request packet, once the 802.1x authentication is in passed state.

An alternative may be accomplished by amending the DHCP process to only start if 802.1x authentications have ended by identifying EAP success state, or if no authentication is present. This can be done by following EAP challenge requests, or the absence of them to signify a secured state is not necessary identifying EAP supplicant state.

As set forth above, the system of embodiments of the present invention provides that the network addressing process will only begin after a host has been authenticated, and access to said wireless network has been granted security wise and thus a host will not attempt to begin address acquirement process until an exchange can actually be carried out.

Figure 2:
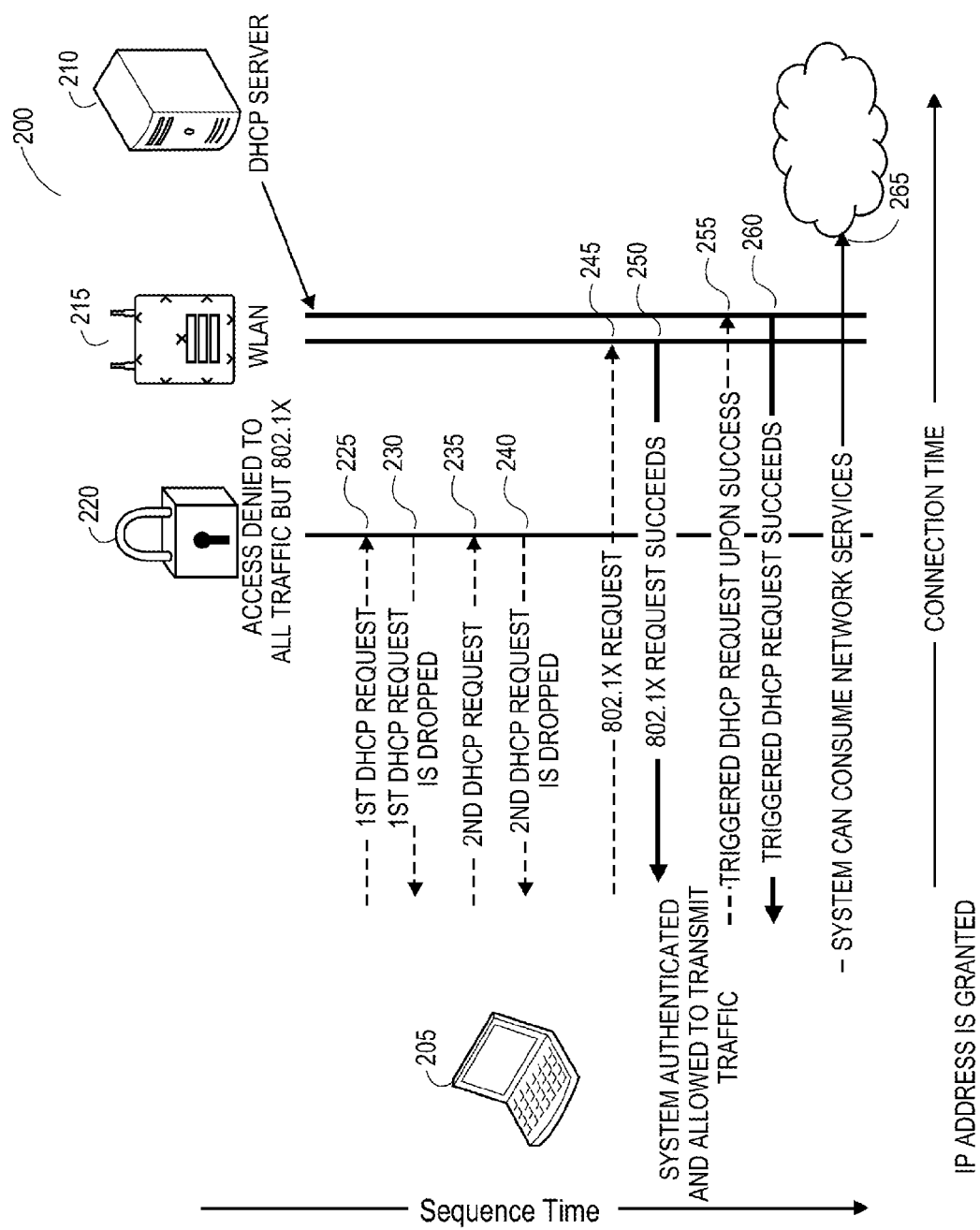
FIG. 2 illustrates the flow in sequence time versus connection time for techniques enabling efficient synchronized authenticated network access of embodiments of the present invention.
Figure 3:
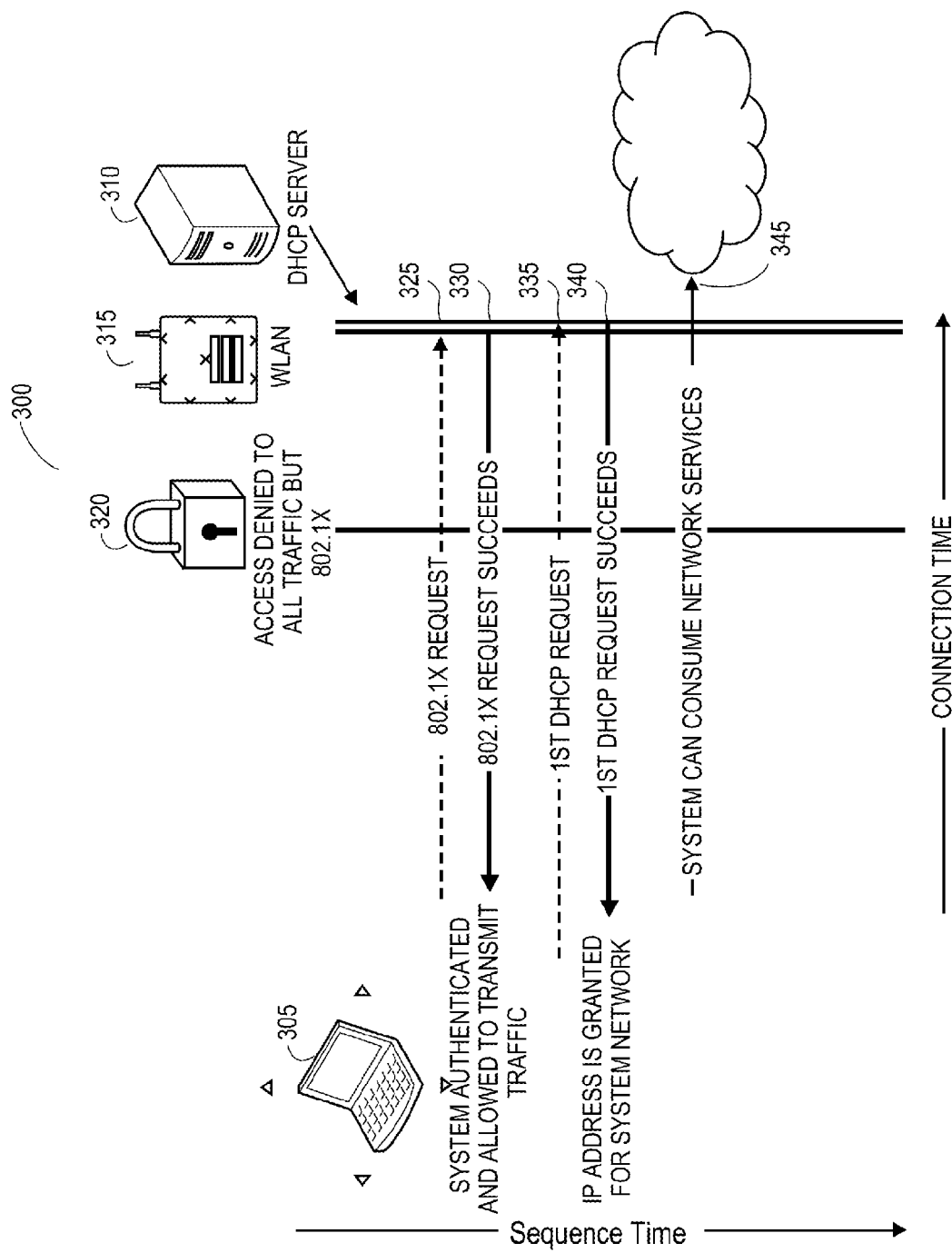
FIG. 3 illustrates the flow in sequence time versus connection time for techniques enabling efficient synchronized authenticated network access of embodiments of the present invention.

Looking now at FIGS. 2 and 3, embodiments of the present invention provide synchronizing 802.1x authentication exchange with DHCP addressing. Although not limited in this respect, embodiments of the disclosure illustrate two options:

A more minimal option is depicted in FIG. 2, generally as 200, which depicts a system 200 according to embodiments of the present invention and may include a mobile device 205, WLAN 215 and DHCP server 210. Access being denied to all traffic but 802.1x is illustrated as 220. Following an 802.1x exchange, including first DHCP request 225, first DHCP request dropped 230, second DHCP request 235, second DHCP request dropped 240, 802.11 request 245 and successful 802.11 request 250, there is a direct trigger 255 by the supplicant to issue a DHCP discover request, rather than waiting for the next cycle of DHCP, which may arrive seconds later, depending on the back off interval configured after the earlier DHCP discover was not answered since the port was not authenticated yet by 802.11x. Triggered DHCP request succeeds at 260 and the system may consume network services at 265.

This does not require changes to the start of the DHCP process, but rather may add an additional synchronized trigger 255 following a successful 802.1x request 250. As a result, initial DHCP may still fail and packets will be dropped, however the network access will not have to be delayed until the next DHCP cycle, due to the trigger.

A second method is to hold off all DHCP exchange until 802.1x completes, which eliminates the initial DHCP failures attempts, once 802.1x has completed successfully, DHCP first discover attempt will be triggered and will be successful, as the port is authorized. The result in saving time of both options is the same, however, this also saves additional unnecessary packet transmissions, but has to factor in absence of security with the lack of 802.1x.

This second method is illustrated in FIG. 3, which provides a system 300 according to embodiments of the present invention and may include a mobile device 305 and a DHCP server, targeted to provide dynamic network layer addresses for clients, such as the mobile device 305, the mobile device may be adapted for accelerating a network connection to the host 310 via a wireless network, such as, but not limited to, via wireless local area network (WLAN) 315, and avoiding unnecessary wait intervals by synchronizing DHCP discover or request packets 325 with an authentication mechanism utilized by the wireless network.

The wireless network may conform to Institute for Electrical and Engineers (IEEE) 802.1x standards 120. The specific 802.1x states trigger a DHCP request 325 to ensure a DHCP process will start in a synchronized way, on-time when needed and capable to provide network access. 802.11 request succeeds at 330 and then a first DHCP request may proceed at 335 with first DHCP succeeding at 340. Thus, system 300 can consume network services at 345.

A network driver associated with the mobile device 305 allows the mobile device to trigger a DHCP discover or request packet 325 once the 802.1x authentication is in passed state.

The system 300 may amend a DHCP process to only start if 802.1x authentications have ended by identifying EAP success state, or if no authentication is present by following EAP challenge requests, or the absence of them to signify a secured state is not necessary identifying EAP supplicant state.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A method of accelerating a network connection by a mobile device to a wireless network and avoiding unnecessary wait intervals, comprising:
   dropping at the wireless network all DHCP requests from the mobile device until an authentication process of the network connection is completed successfully;
   causing an authentication mechanism to generate a direct trigger to indicate that an authentication process completed successfully at a host, wherein the direct trigger is based on specific 802.1x states to ensure the DHCP process will start in a synchronized way, on-time when needed and capable to provide network access;
   in response to the direct trigger from the authentication mechanism, initiating a DHCP request since the host has been authenticated and access to said wireless network has been granted security wise and thus the host can begin an address acquirement process;
   amending a DHCP process to only start if 802.1x authentications have ended by identifying EAP success state, or if no authentication is present by following EAP challenge requests, or the absence of them to signify a secured state is not necessary identifying EAP supplicant state;
   amending a behavior of a network driver allowing it to trigger a DHCP request packet, once the authentication is in passed state;
   wherein at the mobile device a DHCP process to facilitate the network connection is started after receiving the direct trigger from the authentication mechanism.

2. The method of claim 1, wherein said wireless network conforms to Institute for Electrical and Engineers (IEEE) 802.1x standards.

3. An apparatus in a mobile device to accelerate network connection to a wireless network, comprising:
   dropping at the wireless network all DHCP discover requests from the mobile device until the authentication process of the network connection is completed successfully;
   generating a direct trigger after successful completion of an authentication process, wherein the direct trigger is based on specific 802.1 x states to ensure the DHCP process will start in a synchronized way, on-time when needed and capable to provide network access;
   amending a DHCP process to only start if 802.1x authentications have ended by identifying EAP success state, or if no authentication is present by following EAP challenge requests, or the absence of them to signify a secured state is not necessary identifying EAP supplicant state;
   wherein behavior of a network driver is configured to in response to the generated direct trigger have the mobile device issues a DHCP discover request since a host has been authenticated and access to said wireless network has been granted security wise and thus the host can begin an address acquirement process;
   wherein at the mobile device a DHCP process to facilitate the network connection is started after receiving the direct trigger from the authentication mechanism.

4. The apparatus of claim 3, wherein said wireless network conforms to Institute for Electrical and Engineers (IEEE) 802.1x standards.

5. The apparatus of claim 4, wherein a network driver associated with said mobile device allows said mobile device to trigger a DHCP discover or request packet once the 802.1x authentication is in passed state.

6. An apparatus, comprising:
   a host adapted for wireless communication with a mobile device, said mobile device adapted for accelerating a network connection to said host via a wireless network and avoiding unnecessary wait intervals by synchronizing DHCP discover or request packets;
   dropping at the wireless network all DHCP discovery requests from the mobile device until the authentication process of the network connection is completed successfully;
   generating a direct trigger after successful completion of an authentication process, wherein the direct trigger is based on specific 802.1x states to ensure the DHCP process will start in a synchronized way, on-time when needed and capable to provide network access;
   in response to the direct trigger initiating a DHCP process at the mobile device to facilitate the network connection;
   amending a DHCP process to only start if 802.1x authentications have ended by identifying EAP success state, or if no authentication is present by following EAP challenge requests, or the absence of them to signify a secured state is not necessary identifying EAP supplicant state;
   wherein a network addressing process will only begin after a host has been authenticated, and access to said wireless network has been granted security wise and thus a host will not attempt to begin address acquirement process until an exchange can actually be carried out.

7. The apparatus of claim 6, wherein said wireless network conforms to Institute for Electrical and Engineers (IEEE) 802.1x standards.

8. The apparatus of claim 7, wherein a network driver associated with said mobile device allows said mobile device to trigger a DHCP discover or request packet once the 802.1x authentication is in passed state.

9. A system, comprising:
   a mobile device; and
   a host adapted for wireless communication with said mobile device, said mobile device adapted for accelerating a network connection to said host via a wireless network and avoiding unnecessary wait intervals by synchronizing DHCP discover or request packets with an authentication mechanism according to states of a communication protocol utilized by said wireless network;
   wherein the authentication mechanism is adapted to accelerate a network connection to the wireless network by:
   generating a direct trigger after successful completion of an authentication process;
   in response to the direct trigger initiating a DHCP process at the mobile device to facilitate the network connection;
   dropping at the wireless network all DHCP discover requests from the mobile device until the authentication process of the network connection is completed successfully;
   wherein a DHCP process to facilitate the network connection can be started after receiving the direct trigger from the authentication mechanism;
   wherein said wireless network conforms to Institute for Electrical and Engineers (IEEE) 802.1x standards;
   wherein the direct trigger is based on specific 802.1x states to ensure the DHCP process will start in a synchronized way, on-time when needed and capable to provide network access;
   wherein a network driver associated with said mobile device allows said mobile device to trigger a DHCP discover or request packet once the 802.1x authentication is in passed state;
   amending a DHCP process to only start if 802.1x authentications have ended by identifying EAP success state, or if no authentication is present by following EAP challenge requests, or the absence of them to signify a secured state is not necessary identifying EAP supplicant state;
   wherein a network addressing process will only begin after a host has been authenticated, and access to said wireless network has been granted security wise and thus a host will not attempt to begin address acquirement process until an exchange can actually be carried out.

10. A non-transitory non-volatile machine-accessible medium that provides instructions, which when accessed, cause a machine to perform operations comprising:
    accelerating a network connection to a wireless network and avoiding unnecessary wait intervals by synchronizing DHCP discover or request packets by:
    causing an authentication mechanism to generate a direct trigger to indicate that an authentication process completed successfully, wherein the direct trigger is based on specific 802.1x states to ensure the DHCP process will start in a synchronized way, on-time when needed and capable to provide network access;
    dropping at the wireless network all DHCP requests until the authentication process of the network connection is completed successfully;
    initiating a DHCP process in response to the direct trigger to facilitate the network connection; and
    wherein a DHCP process to facilitate the network connection can be started after receiving the direct trigger from the authentication mechanism;
    wherein a network addressing process will only begin after a host has been authenticated, and access to said wireless network has been granted security wise and thus a host will not attempt to begin address acquirement process until an exchange can actually be carried out;
    amending a DHCP process to only start if 802.1x authentications have ended by identifying EAP success state, or if no authentication is present by following EAP challenge requests, or the absence of them to signify a secured state is not necessary identifying EAP supplicant state;
    amending a behavior of a network driver allowing it to trigger a DHCP discover or request packet, once the authentication is in passed state.

11. The non-transitory non-volatile machine-accessible medium that provides instructions, which when accessed, cause a machine to perform operations of claim 10, wherein said wireless network conforms to Institute for Electrical and Engineers (IEEE) 802.1x standards.

12. The method of claim 1, wherein the DHCP discover or request packets are sent from a mobile device and wherein said mobile device is a personal computer, a tablet computer, a mobile information device or a smartphone.

13. The apparatus of claim 3, wherein said mobile device is a personal computer, a tablet computer, a mobile information device or a smartphone.

14. The apparatus of claim 6, wherein said mobile device is a personal computer, a tablet computer, a mobile information device or a smartphone.

15. The apparatus of claim 9, wherein said mobile device is a personal computer, a tablet computer, a mobile information device or a smartphone.

* * * * *